US010986478B2

(12) United States Patent
Tawadrous et al.

(10) Patent No.: US 10,986,478 B2
(45) Date of Patent: *Apr. 20, 2021

(54) USING RANGING OVER C-V2X TO SUPPLEMENT AND ENHANCE GPS PERFORMANCE

(71) Applicant: Panasonic Automotive Systems Company of America, Division of Panasonic Corporation of North America, Peachtree City, GA (US)

(72) Inventors: Sameh Willliam Tawadrous, Senoia, GA (US); Hans A. Troemel, Jr., Sharpsburg, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,479

(22) Filed: Jan. 17, 2020

(65) Prior Publication Data

US 2020/0154248 A1 May 14, 2020

Related U.S. Application Data

(63) Continuation of application No. 16/199,749, filed on Nov. 26, 2018, now Pat. No. 10,575,151.

(60) Provisional application No. 62/597,497, filed on Dec. 12, 2017.

(51) Int. Cl.
| | |
|---|---|
| *H04W 4/44* | (2018.01) |
| *B60R 25/102* | (2013.01) |
| *G01S 5/02* | (2010.01) |
| *H04W 4/46* | (2018.01) |
| *H04W 8/20* | (2009.01) |
| *G01S 5/14* | (2006.01) |
| *G01S 19/00* | (2010.01) |

(52) U.S. Cl.
CPC ............. *H04W 4/44* (2018.02); *B60R 25/102* (2013.01); *G01S 5/0263* (2013.01); *G01S 5/14* (2013.01); *G01S 19/00* (2013.01); *H04W 8/20* (2013.01); *B60W 2556/50* (2020.02); *B60W 2556/60* (2020.02); *H04W 4/46* (2018.02)

(58) Field of Classification Search
CPC ........... H04W 4/44; H04W 4/46; H04W 8/20; B60R 25/102; G01S 5/0263; G01S 5/14; B60W 2556/50
USPC ........................................................ 340/988
See application file for complete search history.

(56) References Cited

U.S. PATENT DOCUMENTS

| | | | |
|---|---|---|---|
| 10,575,151 B2 * | 2/2020 | Tawadrous | G01S 19/46 |
| 2019/0132709 A1 * | 5/2019 | Graefe | H04W 4/38 |
| 2020/0077238 A1 * | 3/2020 | Alexander | H04W 84/005 |

* cited by examiner

*Primary Examiner* — John A Tweel, Jr.
(74) *Attorney, Agent, or Firm* — Laurence S. Roach, Esq.

(57) ABSTRACT

On-board equipment in a motor vehicle includes a C-V2X communication device receiving a first signal from road side equipment having a known position. The C-V2X communication device transmits a second signal having content that is dependent upon a length of time in which the first signal traveled from the road side equipment to the C-V2X communication device. A GPS device is communicatively coupled to the C-V2X communication device and receives the second signal from the C-V2X communication device. The GPS device estimates a position of the vehicle. The estimating is dependent upon the second signal from the C-V2X communication device.

20 Claims, 2 Drawing Sheets

USING RANGING OVER C-V2X TO SUPPLEMENT AND ENHANCE GPS PERFORMANCE

CROSS-REFERENCE TO RELATED APPLICATIONS

This application is a continuation of U.S. patent application Ser. No. 16/199,749, filed on Nov. 26, 2018, which currently under allowance, which claims the benefit of U.S. Provisional Application No. 62/597,497, filed on Dec. 12, 2017, which the disclosure of which are hereby incorporated by reference in their entirety for all purposes.

FIELD OF THE INVENTION

The disclosure relates to determining the global position coordinates of a motor vehicle.

BACKGROUND OF THE INVENTION

An on-board unit (OBU) is the part of a Cellular-Vehicle-To-All (C-V2X) system that is installed in a moving vehicle. On-board equipment (OBE) contains other equipment in addition to the OBU, such as a human machine interface unit and other communication equipment for the vehicle. A road side unit (RSU) is the part of the C-V2X system that is installed on the side of the road. Road side equipment (RSE) contains the RSU in addition to other equipment to link the RSU to the backend network that may be hosted in the cloud.

Position accuracy is a vital parameter in the implementation and success of C-V2X technology. However, position accuracy may be reduced if the GPS receiver cannot accurately determine its location due to a weak signal or travelling in a tunnel.

SUMMARY

The present invention may implement ranging over the C-V2X communication channel to enhance GPS performance in a motor vehicle. The C-V2X device in the vehicle may communicate with a C-V2X base station or with RSU. Both the RSU and the base station have a known location. The C-V2X device in the vehicle can accurately calculate its proximity or location from the RSU or from the base station each time the C-V2X device receives a signal. Also, by knowing the exact frequency used in the channel, and knowing the time of arrival of the signal, one can calculate the displacement offset from the last reference point when this calculation was last performed. This displacement offset information can supplement GPS location if the GPS receiver cannot accurately determine its location due to a weak signal as in the case of travelling in a tunnel. Further, the displacement offset information can be used to improve the GPS location fix accuracy even if the GPS receiver is able to calculate a fix. More location information can also be obtained using ranging information like vehicle speed. This location information combined with information from other sensors in the car may be very useful to a dead reckoning algorithm to ultimately achieve location accuracy on the order of centimeters, which may be needed for the C-V2X system to achieve its safety targets. Another way to measure the distance displacement is to measure the time difference between two round trips of a signal in a special mode of transmission.

In one embodiment, the invention comprises on-board equipment in a motor vehicle. The on-board equipment includes a C-V2X communication device receiving a first signal from road side equipment having a known position. The C-V2X communication device transmits a second signal having content that is dependent upon a length of time in which the first signal traveled from the road side equipment to the C-V2X communication device. A GPS device is communicatively coupled to the C-V2X communication device and receives the second signal from the C-V2X communication device. The GPS device estimates a position of the vehicle. The estimating is dependent upon the second signal from the C-V2X communication device.

In another embodiment, the invention comprises a global positioning method for a motor vehicle, including the following steps performed within the motor vehicle. A C-V2X signal is received from road side equipment having a known position. A distance signal is transmitted having content that is dependent upon a length of time in which the C-V2X signal traveled from the road side equipment to the motor vehicle. The distance signal is received. A position of the vehicle is estimated. The estimating is dependent upon the distance signal.

In yet another embodiment, the invention comprises on-board equipment in a motor vehicle. The on-board equipment includes a C-V2X communication device receiving a first signal from road side equipment having a known position. The C-V2X communication device transmits a second signal indicative of a length of time it took for the first signal to travel from the road side equipment to the C-V2X communication device. A GPS device is communicatively coupled to the C-V2X communication device and receives the second signal from the C-V2X communication device. The GPS device estimates a position of the vehicle. The estimating is dependent upon the second signal from the C-V2X communication device.

An advantage of the present invention is that it may, in OBE, reduce GPS position error from meters to a lane-accurate level (e.g., centimeters). This is very important for robust implementation of many safety apps in the connected industry.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
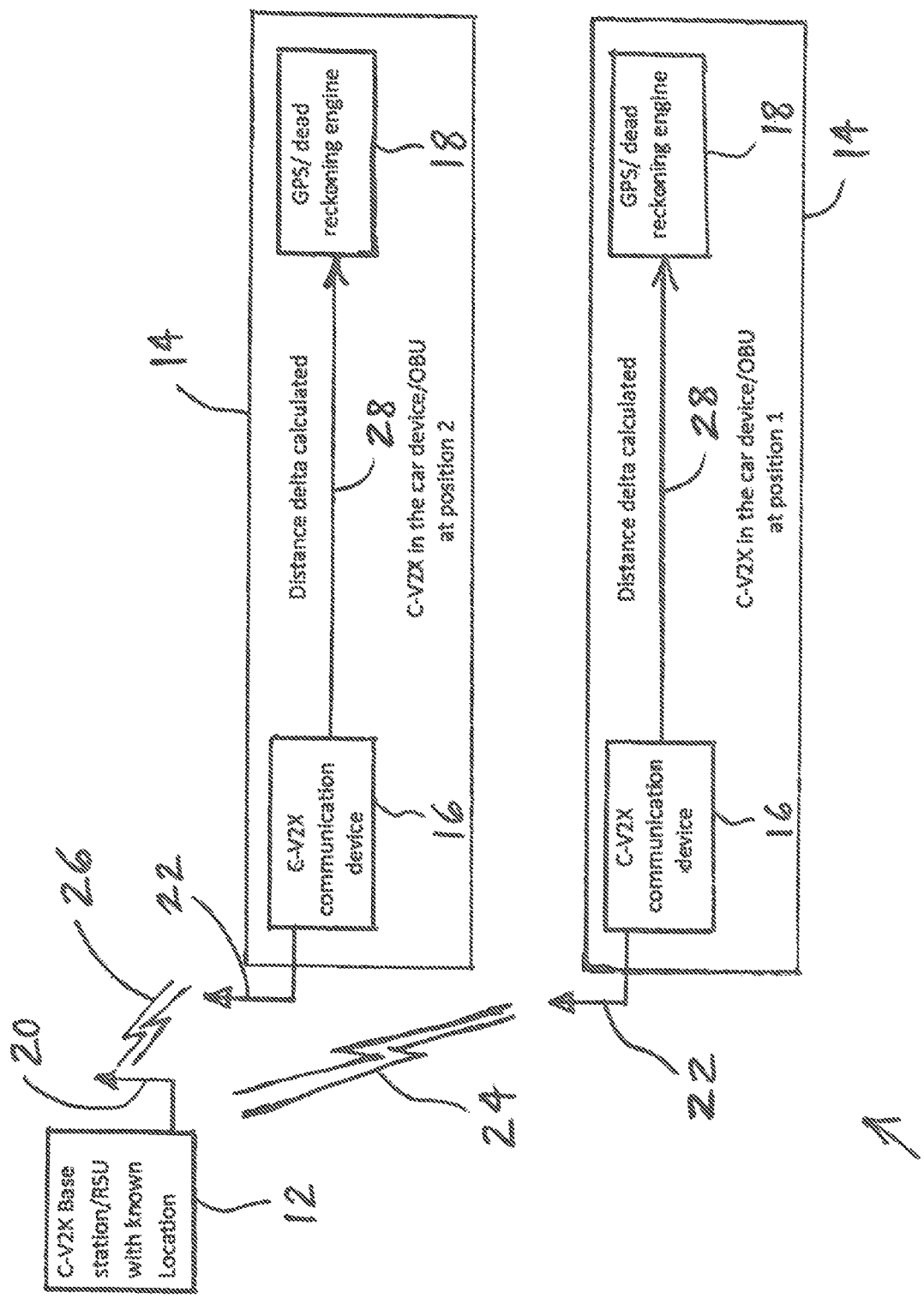
FIG. 1 is a block diagram of one example embodiment of a global positioning arrangement of the present invention for a motor vehicle.

FIG. 1 illustrates one example embodiment of a global positioning arrangement 10 of the present invention for a motor vehicle. Arrangement 10 includes a C-V2X base station/RSU 12 having a known location, and a motor vehicle 14 having a C-V2X communication device 16 and a GPS dead reckoning engine 18. Motor vehicle 14 is shown at a first position, "position 1", at the bottom of FIG. 1, and at a second position, "position 2", in the middle of FIG. 1. C-V2X base station/RSU 12 and motor vehicle 14 each include a respective C-V2X antenna 20, 22. To be clear, motor vehicle 14 may be at positions 1 and 2 at different times, but cannot be at both positions 1 and 2 at the same time.

During use, C-V2X base station/RSU 12 has a pre-known position which was determined when C-V2X base station/RSU 12 was permanently and fixedly installed. This pre-known position may be communicated to motor vehicle 14. A signal transmitted by antenna 20 may arrive at position 1, as indicated at 24; and a signal transmitted by antenna 20 may arrive at position 2, as indicated at 26. Because position 2 is closer to antenna 20 than is position 1, the signal arrives at position 2 faster than it arrives at position 1. Capturing this time delta can be translated to a position delta based on the known speed of the signal. The calculated position delta or distance delta may be transmitted from C-V2X communication device 16 to GPS dead reckoning engine 18, as indicated at 28, and may be used by GPS dead reckoning engine 18 to improve the accuracy of its location calculation.

The time it takes for the signal to travel from antenna 20 to antenna 22 may be determined by any of a number of possible methods. For example, the signal may include the time at which the signal is transmitted from antenna 20, and C-V2X communication device 16 may calculate the difference between this time of transmission and the time at which antenna 22 receives the signal.

In another embodiment, C-V2X communication device 16 may transmit a response signal to C-V2X base station/RSU 12 in response to receiving the signal from C-V2X base station/RSU 12. C-V2X base station/RSU 12 may then calculate the time difference between the time at which C-V2X base station/RSU 12 transmitted the first signal and the time at which C-V2X base station/RSU 12 received the second signal. This total roundtrip time may then be transmitted to C-V2X communication device 16 for use by GPS dead reckoning engine 18 in calculating its location.

Figure 2:
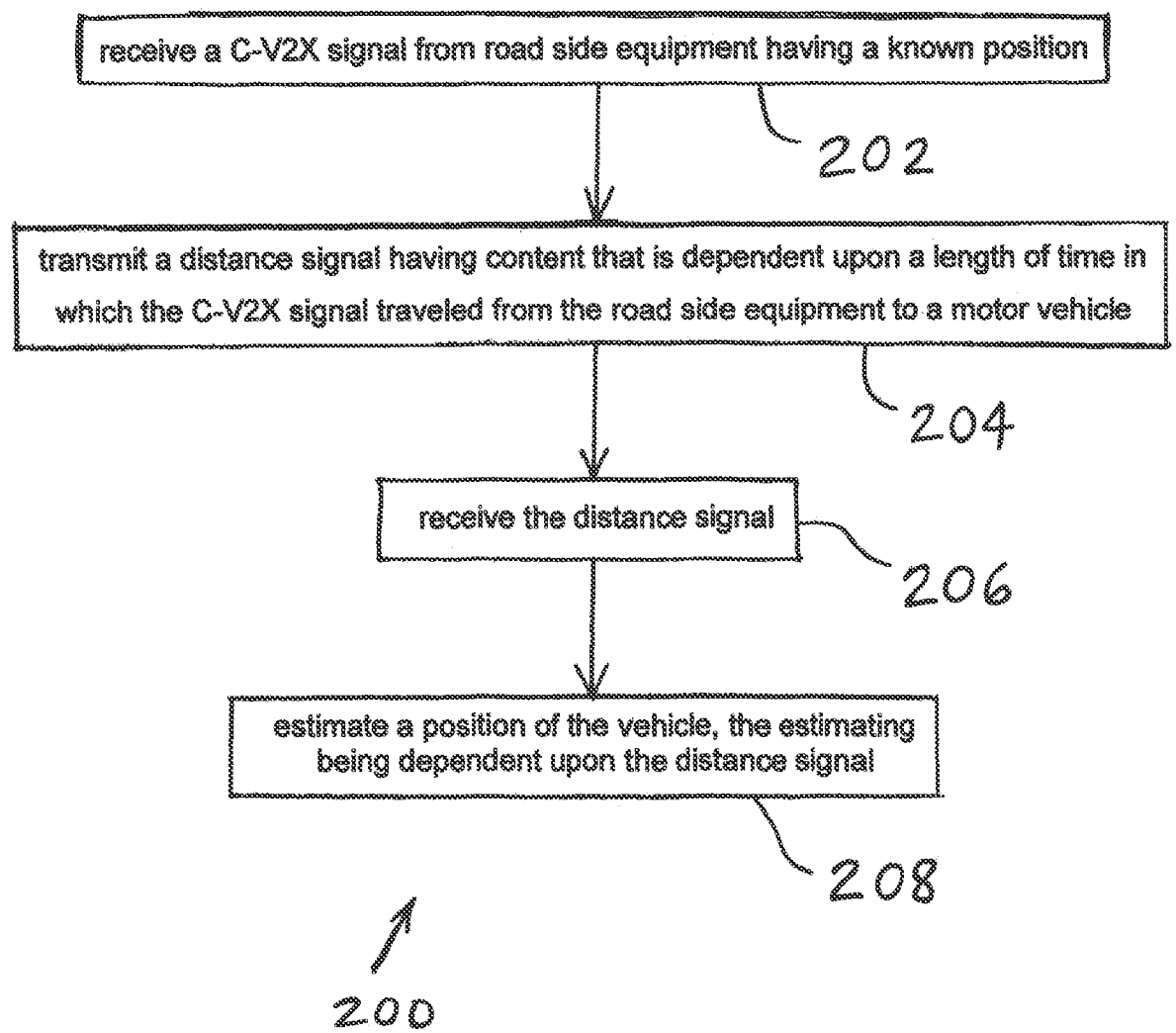
FIG. 2 is a flow chart of one embodiment of a global positioning method of the present invention for a motor vehicle.

FIG. 2 illustrates one embodiment of a global positioning method 200 of the present invention for a motor vehicle. In a first step 202, a C-V2X signal is received from road side equipment having a known position. For example, C-V2X base station/RSU 12 has a pre-known position which was determined when C-V2X base station/RSU 12 was permanently and fixedly installed. This pre-known position may be communicated to motor vehicle 14.

In a next step 204, a distance signal is transmitted having content that is dependent upon a length of time in which the C-V2X signal traveled from the road side equipment to the motor vehicle. For example, a signal transmitted by antenna 20 may arrive at position 1, as indicated at 24; and a signal transmitted by antenna 20 may arrive at position 2, as indicated at 26. Because position 2 is closer to antenna 20 than is position 1, the signal arrives at position 2 faster than it arrives at position 1. Capturing this time delta can be translated to a position delta based on the known speed of the signal. The calculated position delta or distance delta may be transmitted as a distance signal from C-V2X communication device 16.

Next, in step 206, the distance signal is received. For example, GPS dead reckoning engine 18 may receive the distance signal, as indicated at 28.

In a final step 208, a position of the vehicle is estimated. The estimating is dependent upon the distance signal. For example, the distance signal may be used by GPS dead reckoning engine 18 to improve the accuracy of its location calculation.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. On-board equipment in a motor vehicle, the on-board equipment comprising:
   a C-V2X communication device configured to receive a first signal from road side equipment, the C-V2X communication device being configured to transmit a second signal having content that is dependent upon a length of time in which the first signal traveled from the road side equipment to the C-V2X communication device; and
   a dead reckoning engine communicatively coupled to the C-V2X communication device and configured to:
      receive the second signal from the C-V2X communication device; and
      estimate a position of the vehicle, the estimating being dependent upon the second signal from the C-V2X communication device.

2. The on-board equipment of claim 1 wherein the second signal indicates a distance dependent upon the length of time in which the first signal traveled from the road side equipment to the C-V2X communication device.

3. The on-board equipment of claim 1 wherein the estimating is dependent upon an immediately previously estimated position of the vehicle.

4. The on-board equipment of claim 1 wherein the C-V2X communication device is configured to receive the first signal from a C-V2X base station.

5. The on-board equipment of claim 1 wherein the road side equipment has a known position.

6. The on-board equipment of claim 1 further comprising an electronic processor communicatively coupled to the dead reckoning engine and configured to determine, based upon the estimated position of the vehicle, a traffic lane in which the motor vehicle is traveling.

7. The on-board equipment of claim 1 wherein the estimated position of the vehicle is accurate to within less than one meter.

8. A global positioning method for a motor vehicle, the method comprising the following steps performed within the motor vehicle:
   receiving a C-V2X signal from road side equipment;
   producing content that is dependent upon a length of time in which the C-V2X signal traveled from the road side equipment to the motor vehicle;
   and
   estimating a position of the vehicle, the estimating being dependent upon the content.

9. The method of claim 8 wherein the content indicates a distance dependent upon the length of time in which the C-V2X signal traveled from the road side equipment to the motor vehicle.

10. The method of claim 8 wherein the estimating is dependent upon an immediately previously estimated position of the vehicle.

11. The method of claim 8 wherein the receiving includes receiving the C-V2X signal from a C-V2X base station.

12. The method of claim 8 wherein the road side equipment has a known position.

13. The method of claim 8 further comprising determining, based upon the estimated position of the vehicle, a traffic lane in which the motor vehicle is traveling.

14. The method of claim 8 wherein the estimated position of the vehicle is accurate to within less than one meter.

15. On-board equipment in a motor vehicle, the on-board equipment comprising:
- a C-V2X communication device configured to receive a first signal from road side equipment, the C-V2X communication device being configured to transmit a second signal indicative of a length of time it took for the first signal to travel from the road side equipment to the C-V2X communication device; and
- a dead reckoning engine communicatively coupled to the C-V2X communication device and configured to:
  receive the second signal from the C-V2X communication device; and
  estimate a position of the vehicle, the estimating being dependent upon the second signal from the C-V2X communication device.

16. The on-board equipment of claim 15 wherein the second signal indicates a distance dependent upon the length of time it took for the first signal to travel from the road side equipment to the C-V2X communication device.

17. The on-board equipment of claim 15 wherein the estimating is dependent upon an immediately previously estimated position of the vehicle.

18. The on-board equipment of claim 15 wherein the C-V2X communication device is configured to receive the first signal from a C-V2X base station.

19. The on-board equipment of claim 15 wherein the road side equipment has a known position.

20. The on-board equipment of claim 15 further comprising an electronic processor communicatively coupled to the dead reckoning engine and configured to determine, based upon the estimated position of the vehicle, a traffic lane in which the motor vehicle is traveling.

* * * * *